(12) United States Patent
Caretta et al.

(10) Patent No.: US 6,540,858 B1
(45) Date of Patent: Apr. 1, 2003

(54) METHOD FOR REDUCING THE WORKING TEMPERATURE OF A TIRE TREAD FOR VEHICLES AND SOME TIRE TREADS CAPABLE OF PERFORMING SAID METHOD

(75) Inventors: Renato Caretta, Varese; Marco Nahmias Nanni, Milan, both of (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 08/946,233

(22) Filed: Oct. 7, 1997

(30) Foreign Application Priority Data

Mar. 14, 1997 (IT) .......................... MI97A0584

(51) Int. Cl.$^7$ .................... B29D 30/00; B60C 1/00; B60C 11/00
(52) U.S. Cl. .................. 156/110.1; 29/428; 152/209.5; 152/209.8
(58) Field of Search ................ 156/110.1, 123, 156/128.1; 152/209 R, 209 D, 209 A, 152.1, DIG. 2; 29/428

(56) References Cited

U.S. PATENT DOCUMENTS

| | | | |
|---|---|---|---|
| 2,329,332 A | * 9/1943 | Bull et al. | 152/DIG. 2 |
| 3,768,537 A | * 10/1973 | Hess et al. | 152/209 R |
| 4,319,620 A | 3/1982 | Knill | |
| 4,385,653 A | * 5/1983 | Okazaki et al. | 152/209 R |
| 5,225,011 A | 7/1993 | Takino et al. | |
| 5,518,055 A | * 5/1996 | Teeple et al. | 152/DIG. 2 |
| 5,898,047 A | * 4/1999 | Howald et al. | 152/152.1 |
| 5,937,926 A | * 8/1999 | Powell | 152/DIG. 2 |

FOREIGN PATENT DOCUMENTS

| | | | |
|---|---|---|---|
| CH | 597008 | * 3/1978 | ............. 152/152.1 |
| DE | 3048489 | 10/1981 | |
| EP | 0104133 | 3/1984 | |
| EP | 0105822 | 4/1984 | |
| EP | 0200179 | 11/1986 | |
| EP | 0658452 | 6/1995 | |
| EP | 0662396 | 7/1995 | |
| EP | 0681931 | 11/1995 | |
| EP | 0686515 | 12/1995 | |
| EP | 0715974 | 6/1996 | |
| EP | 0732229 | 9/1996 | |
| EP | 0738614 | 10/1996 | |
| EP | 747243 | * 12/1996 | ............ 152/DIG. 2 |

* cited by examiner

Primary Examiner—Steven D. Maki
(74) Attorney, Agent, or Firm—Stevens, Davis, Miller & Mosher, LLP

(57) ABSTRACT

A method for reducing the working temperature of a tire tread for vehicles utilizing a tire tread comprising a first portion and a second portion. The first portion comprising 100 parts by weight of an elastomeric material, 40–120 parts by weight of a filler, comprising from 50 to 100% by weight of carbon black and from 0 to 50% of silica, and 3–40 parts by weight of at least a conventional additive. The second portion comprising 100 parts by weight of an elastomeric material, 40–120 parts by weight of a filler, comprising from 30 to 100% by weight of silica and from 0 to 70% of carbon black, and 3–40 parts by weight of at least a conventional additive. However, the silica content in the second portion is at least 20% higher than in the first portion. Tires wherein the area of the first portion exceeds 37.1% of the total area of the tire tread are also disclosed.

8 Claims, 6 Drawing Sheets

(1 of 6 Drawing Sheet(s) Filed in Color)

METHOD FOR REDUCING THE WORKING TEMPERATURE OF A TIRE TREAD FOR VEHICLES AND SOME TIRE TREADS CAPABLE OF PERFORMING SAID METHOD

FIELD OF THE INVENTION

The present invention relates to a method for reducing the working temperature of a tire tread for vehicles and some tire treads capable of performing said method.

More in particular, the present invention relates to a method for reducing the working temperature of a tire tread for vehicles utilizing a tire tread consisting of a first and a second portion made of an elastomeric mixture comprising a filler, wherein the filler present in said first portion is mainly composed of carbon black while a substantial part of the filler present in said second portion is composed of silica.

BACKGROUND OF THE INVENTION

Modern tires are required to show not only a good performance when running on any type of surface, dry, wet, snowy, but also a good qualitative level referred to other functional features such as, for example, comfort, smoothness and mileage, and these features have to be maintained even when the tire runs under critical or extreme conditions. For example, a too high speed compared to the type of road, especially when combined with a high ambient temperature.

The performance of a tire depends on circumferential and/or transversal grooves and notches in the tread that form seams and/or blocks, variously arranged so as to form a specific tread pattern designed in view of the type of use expected for the tire. Typically, a tread pattern is said to be symmetrical when its outlook is the same irrespective from the rolling direction of the tire. By converse, it is said to be asymmetrical when its outlook changes depending on the rolling direction. Furthermore, a tread pattern is said to be directional when it identifies a particular, preferred direction of rotation of the tire, that is when it is specular with respect to the equatorial plane of the same.

Furthermore the performance of a tire is affected to a considerable extent by the working temperature. One of the most difficult problems is to reconcile a good resistance to wear with an adequate road-holding both at normal (i.e. 30° C.–70° C., generally 30–60° C., typically 30–50° C.) and high (i.e. more than 70° C., and even more than 100° C. in case of a very fast car) working temperatures, the latter being caused by the high thermomechanical stresses produced by driving in extreme conditions.

In fact, in order to achieve a good resistance to wear and low resistance to rolling it is necessary to use elastomeric mixtures showing a low level of working temperature. By converse, in order to achieve a good road-holding, it is necessary to use elastomeric mixtures having a high level of working temperature thereby dissipating a high amount of energy and ensuring high adherence of the tread to the ground.

Hence, the theoretical models for an optimal tread require conflicting working temperature levels.

So far, the attempts made in the art to improve the performance of a tire in a temperature range other than that of normal usage (i.e. of from about 10 to about 40° C. in winter season and of from about 30 to about 60° C. in summer season) resulted either in a substantial and undesired loss of road-holding and/or in a substantial worsening of the resistance to abrasion of the tread.

SUMMARY OF THE INVENTION

Now, it has been unexpectedly found a valuable solution to the above mentioned problem.

Initially the applicant faced the problem of producing tires having some colored portions, and more particularly tires whose tread includes at least one colored insert. In fact, a two-colored tire, in addition to exhibiting a pleasant and unusual aesthetic appearance, allowing for example the customization of a vehicle with preferred colors, would also have some practical advantages. For example, a first advantage would be to make the correct assembly of a tire easier on the vehicle in case of asymmetrical tires. A second advantage, would be to allow an immediate identification of each type of many tires stored in a warehouse.

The applicant departed from the consideration that the production of colored elastomeric mixtures precludes the addition, even in a minimal proportion, of carbon black as a filler for the elastomeric mixture since the coloring power of carbon black is so high that it conceal any other colored pigment.

Only the so-called white charges can, in fact, be colored with suitable pigments. Typical white charges for use in tires, in particular in the tread, are made of silicon compounds, preferably silica.

However, silica is known to provide an elastomeric mixture for a tire having a low resistance to rolling and a good road-holding on snowy and wet roads while reduces both road-holding on dry roads in highly severe conditions and resistance to wear. Hence, the use of silica as a filler for the elastomeric mixture in tire tread implies careful evaluations.

By examining the road test results from a number of tire prototypes having the tread made of two different circumferential and axially side-by-side portions, the first made of an elastomeric mixture charged mainly with carbon black (black elastomeric mixture) the second made of an elastomeric mixture charged only with a white charge (white elastomeric mixture), the inventors have unexpectedly perceived that the performances on a dry road of this tire are superior compared to both a first comparison tire wherein the very same tread is made from the very same elastomeric mixture charged with carbon black only and a second comparison tire wherein the very same tread is made from the very same elastomeric mixture charged with silica only.

In order to understand the reason for this unexpected and inexplicable effect, the applicant has also performed thermographies on the tread of the tires under test and has unexpectedly found that the two-colored tires always ran at a colder temperature than the comparison black tires. Even more unexpectedly, also the black portion per se of said prototypes leant to work at a lower temperature compared to the corresponding tread portion in the comparison black tires.

Without intending to be bound in any way by this theory, it has been assumed that the portion of white elastomeric mixture develops a synergic action that keeps cooler than usual the adjacent portion of black elastomeric mixture as well, thereby reducing the working temperature of all the tire in its entirety.

EP-A-0 658 452 discloses a tire wherein the tread band has a low content of carbon black and a high content of silicon (or other non conductive fillers) thereby being antistatic in nature. In order to increase the electric conductivity thereof, said tire further comprises at least one conductive insert made of an elastomeric material incorporated in the tread band and extending through the whole tread band thickness, being then exposed externally of the rolling surface, wherein the elastomeric material forming said conductive insert exhibits an electric resistivity lower than that of the elastomeric material forming the tread band. When said inserts are two or more their overall width measured parallel of the tire axis is of from 4 to 50 mm. Since the total width of a tread band ranges from about 135 mm to about 285 mm, the maximum width of the conductive inserts is of 37% of the width of the tread band.

Similarly, EP-A-0 681 931 discloses a tire tread which is electrically conducting. More particularly, this document teaches to make an electrically conducting tire tread comprising an elongated strip of tire tread compound of high resistivity having a transverse width (TR) and, within the transverse width (TR), a longitudinally extending conducting strip of low resistivity tire compound with a volume resistivity less than $10^8$ ohm cm, said conducting strip extending from the top to the bottom surface of the tread strip. In a specific embodiment, the high resistivity compound comprises silica as reinforcement or filler material while the low resistivity compound comprises carbon black as reinforcing filler. The width of the conducting strip is preferably in the range of 5–25% of the width of the tire tread (TR). The working temperature of said tire tread is never mentioned.

In a first aspect, this invention refers to a method for reducing the working temperature of a tire tread for vehicles utilizing a tire tread consisting of:
a) a first portion (A) comprising:
  100 parts by weight of an elastomeric material,
  40–120 parts by weight of a filler comprising from 50 to 100% by weight of carbon black and from 0 to 50% of silica, and
  3–40 parts by weight of at least a conventional additive;
b) a second portion (B) comprising:
  100 parts by weight of an elastomeric material,
  40–120 parts by weight of a filler comprising from 30 to 100% by weight of silica and from 0 to 70% of carbon black, and
  3–40 parts by weight of at least a conventional additive, provided, however, that the silica content in portion (B) is at least 20% higher than in portion (A).

In the present description and in the claims attached thereto, the terms "portion A" and "portion B" do not imply that the tire tread of this invention is made of a single strip "A" and a single strip "B". A number of strips "A" and "B" may be variously combined in the tire tread of this invention such as, for example, A/B, B/A, A/B/A, A/B/A/B/A, and so like. Any strip "A" and "B" will have, however the composition set forth above.

Although said portions A and B will be preferably arranged circumferentially (i.e. longitudinally), they may also be arranged transversally, either perpendicularly or diagonally, with respect with the equatorial plane of the tire.

Typically, the amount of filler in said first portion (A) is of from 60 to 80 parts by weight.

Preferably, the percentage of carbon black in said filler of said first portion (A) is of from 80 to 100% by weight.

Typically, the amount of filler in said second portion (B) is of from 60 to 80 parts by weight.

Preferably, the percentage of silica in said filler of said second portion (B) is of from 60 to 100% by weight.

More preferably, the percentage of silica in said filler of said second portion (B) is of from 80 to 100% by weight.

Even more preferably, the percentage of silica in said filler of said second portion (B) is of 100% by weight. In such a case, the elastomeric mixture of portion (B) preferably comprises also at least one coloring pigment selected from the well-known pigments usually added to the elastomeric mixtures.

Typically, said elastomeric material is selected from natural rubber, 1,4-cis polybutadiene, polychloroprene, 1,4-cis polyisoprene, optionally halogenated isoprene/isobutene copolymers, butadiene-acrylonitrile rubber, styrene-butadiene rubber, styrene-butadiene-isoprene terpolymers prepared either by solution or emulsion polymerization, ethylene-propylene-diene terpolymers, and mixtures thereof.

Preferably, said conventional additives are selected from vulcanizers, vulcanization accelerating agents, ZnO, stearic acid, antioxidants, plasticizers, antiaging agents, antifatigue agents, gypsum, talc, kaolin, bentonite, $TiO_2$, silicates, colored pigments, binding agents capable of chemically reacting with silica in order to bind the latter to the elastomeric mixture during vulcanization, and mixtures thereof. A typical example of binding agent is the silanic compound Si69 by Degussa, Germany.

The tires where the area of said portion A exceeds 37% of the total area of the tire tread are in the tires of the present invention, the area of said portion A exceeds 37% of the total area of the tire tread.

For the purpose of this invention, the expression "total area of the tire tread" is intended to mean the circumferential portion of the tire whose width (L in FIGS. 1, 3 and 5, circle arch C—C in FIG. 2) is delimited by the two lines running where the tread intersects the two sidewalls of the tire.

In a second aspect, this invention refers to a tire for vehicles having a tread consisting of:
a) a first portion (A) comprising:
  100 parts by weight of an elastomeric material,
  40–120 parts by weight of a filler comprising from 50 to 100% by weight of carbon black and from 0 to 50% of silica, and
  3–40 parts by weight of at least a conventional additive;
b) a second portion (B) comprising:
  100 parts by weight of an elastomeric material,
  40–120 parts by weight of a filler comprising from 30 to 100% by weight of silica and from 0 to 70% of carbon black, and
  3–40 parts by weight of at least a conventional additive, wherein the silica content in portion (B) is at least 20% higher than in portion (A).
characterized in that the area of said portion A is of from 37.1% to 80% of the total area of the tire tread.

Preferably, the area of said portion A is of from 40% to 70%, and even more preferably of from 50% to 60% of the total area of the tire tread.

BRIEF DESCRIPTION OF THE DRAWINGS

The patent or application file contains at least one drawing executed in color. Copies of this patent or patent application publication with color drawings will be provided by the office upon request and payment of the necessary fee.

The invention will now become more evident from the following description and the enclosed drawings, having the aim of describing and showing some preferred embodiments without, however, limiting it in any way.

DETAILED DESCRIPTION OF THE PREFERRED EMBODIMENTS

Figure 1:
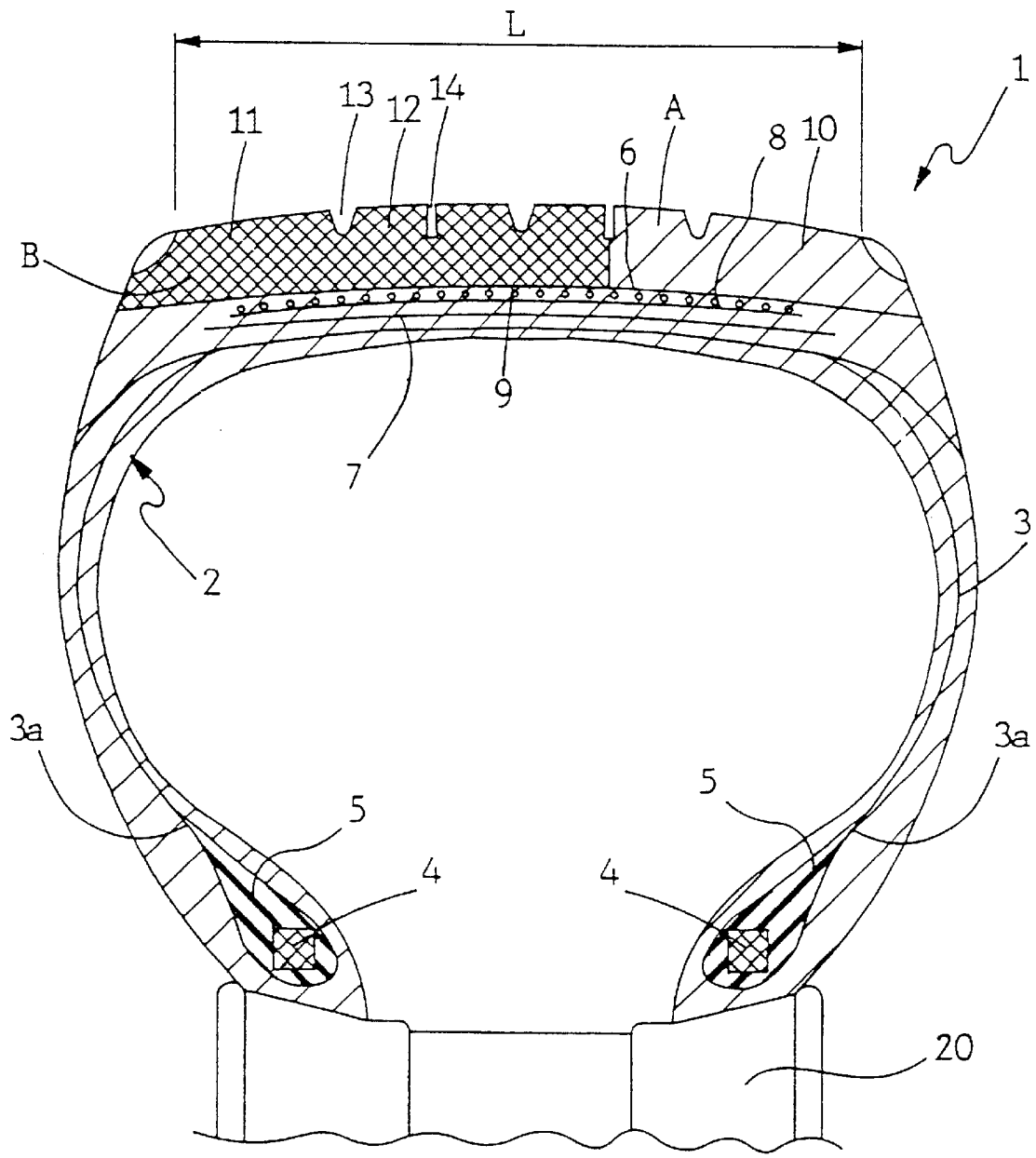
FIG. 1 is an axial cross-section of a tire of this invention for a four-wheeled vehicle.

FIG. 1 shows the structure of a tire of this invention for a four-wheeled vehicle assembled on a rim. Such structure is conventional in nature except for the composition of the tread as described hereinbelow.

The tire 1 comprises a carcass 2 having a resistant structure formed by one ply 3 of a rubber-coated fabric comprising reinforcing cords, made of textile or metal thread, sunk in the elastomeric material of the fabric, having its ends 3a each turned down round an anchoring bead wire 4, the latter being provided on its radially external surface with a rubber element 5. Preferably the turned down flaps 3a of the plies of the carcass go back up radially towards the outside along at least part of the sidewall of the above mentioned rubber element.

As is known, the area of the tire comprising the bead wire 4 and the element 5, that is the radially internal part of the sidewall of the tire, forms the bead, aimed to anchor the tire to a corresponding assembly rim 20.

On the carcass, preferably of the radial type, that is with the reinforcing cords lying in planes containing the axis of rotation of the tire, there is arranged in a known manner a tread 10, provided with a pattern in relief for the rolling contact of the tire on the ground. The width L of such tread is identified by the distance between the points of intersection of the curvatures of the tread and of the sidewalls.

Such tread pattern comprises a plurality of seams and/or blocks 11, 12 separated one from the other by corresponding notches and grooves 13, 14, directed both circumferentially and transversally, said seams and/or blocks may be provided with various slits and cuts. The combination of said structural elements may generate many different configurations well-known to the persons skilled in the art.

The tire 1 can also comprise a belt-like structure 6 arranged in crown to the carcass 2, interposed between carcass and tread, and extended from one sidewall to the other of the tire, that is substantially as wide as the tread. Said belt-like structure 6 comprises two radially superimposed layers 7, 8 of reinforcing cords, preferably metallic, wherein said reinforcing cords are parallel to one another in each layer and cross those of the adjacent layer with respect to the equatorial plane of the tire. Preferably, said belt-like structure 6 further comprises an additional external layer 9 of reinforcing cords, preferably made of textile threads, and even more preferably of heat-shrinking material (nylon), oriented at 0°, that is in the circumferential direction.

The tread of tire 1 comprises axially adjacent, circumferential portions: a first portion A and a second portion B, respectively.

A suitable elastomeric mixture for portion A has the following composition. The amounts are given in parts by weight.

| Components | Amounts |
| --- | --- |
| elastomeric material | 100.0 |
| carbon black | 68.0 |
| ZnO | 2.0 |
| stearic acid | 1.0 |
| antioxidants | 2.5 |
| antifatigue agents | 1.0 |
| plasticizers | 15.0 |
| sulphur | 1.5 |
| vulcanization accelerating agents | 1.8 |

A suitable elastomeric mixture for portion B has the following composition. The amounts are given in parts by weight.

| Components | Amounts |
| --- | --- |
| elastomeric materal | 100.0 |
| silica | 70.0* |
| ZnO | 2.0 |
| stearic acid | 1.0 |
| antioxidants | 2.5 |
| antifatigue agents | 1.0 |
| plasticizers | 15.0 |
| sulphur | 1.2 |
| vulcanization acceierating agents | 2.5 |

*70 parts of silica comprise about 5.6 parts by weight (i.e. 8% w/w) of a binding agent.

Since the second portion B is more sensitive to wear and more prone to cause loss of road-holding on dry road, in those tires which are not made to work in extreme conditions said second portion B is preferably arranged on the internal tread side facing with the vehicle (hereinafter identified as B/A combination), thereby minimizing the stress of portion B on a bend.

In further embodiments (not shown) relating to a high-performance tire for use under extreme conditions an intermediate position (A/B/A combination) will be preferred for symmetrical and directional patterns while a lateral position (B/A combination) will be preferred for asymmetrical patterns.

Figure 2:
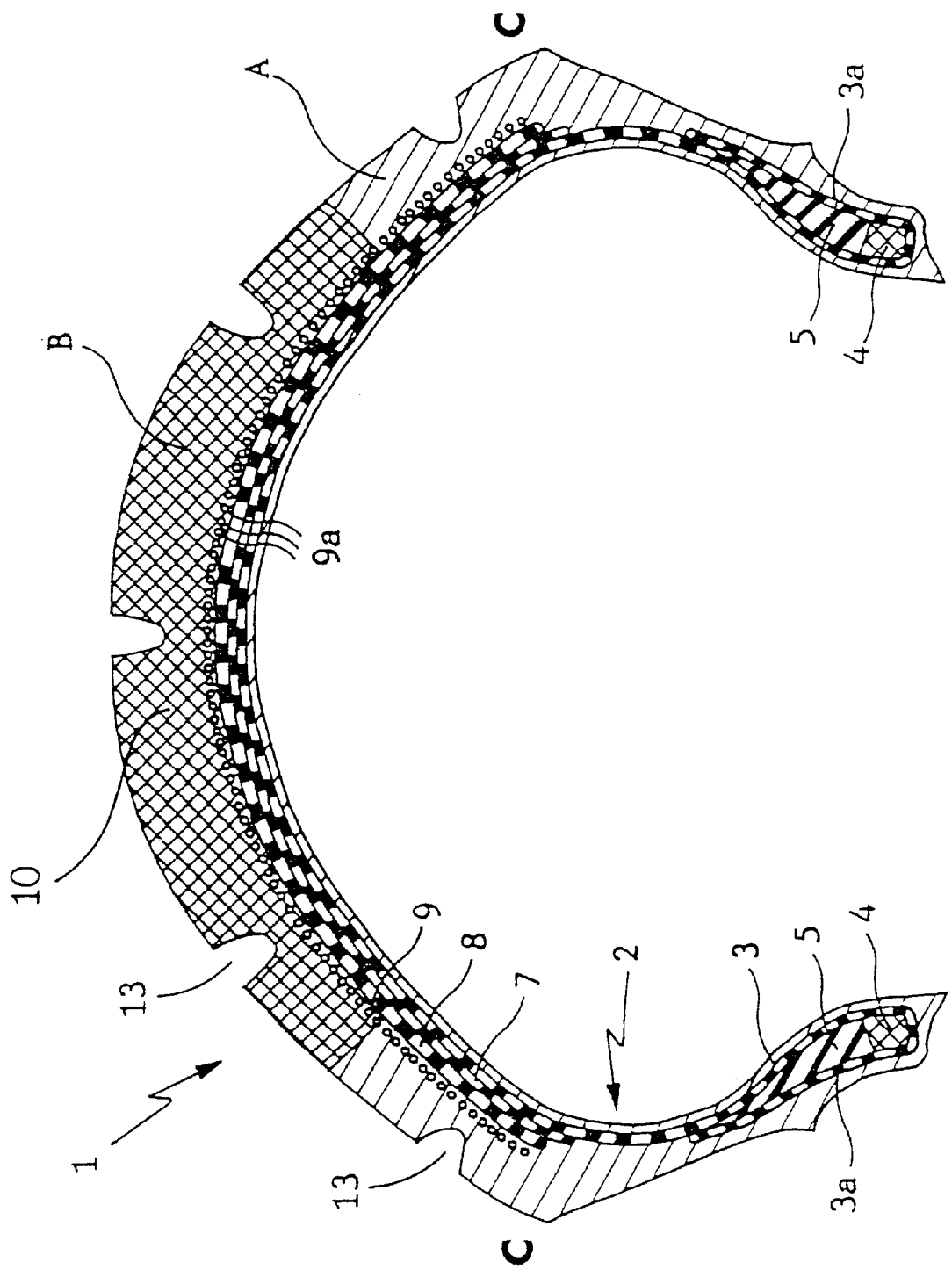
FIG. 2 is an axial cross-section of a tire of this invention for a two-wheeled vehicle.

FIG. 2 shows a tire for motorcycle according to this invention. This tire has a high transversal curvature. For the purposes of the present invention, the width of the tread is the circle arch C—C.

The embodiment of FIG. 2 has a very peculiar geometry suitable for extreme working conditions; as is known, two-wheeled vehicles, in going through a curvilinear trajectory, bend over along the side internal to the bend according to an angle, defined as the "camber" angle, having a value up to 650° with respect to the plane vertical to the ground.

The carcass structure of this tire is substantially equivalent to that described above. Hence, there will be used the same numerical references as in FIG. 1. However, in FIG. 2 the belt-like structure comprises, as an essential element, a reinforcing winding consisting of at least one substantially non extensible cord 9, preferably metallic, extending circumferentially in crown to the carcass ply 3 to form a plurality of turns 9a parallel and side-by-side consecutive each other, oriented substantially according to the rolling direction of the tire 1, while any radially underlying plies 7, 8 of inclined cords are less critical.

Thanks to their substantially longitudinal inextensibility, turns 9a consecutively side-by-side according to a curvilinear profile give a structural and dimensional stabilization to the tire 1 according to the desired profile of transversal curvature.

According to the invention, the tread 10 consists of portions of elastomeric mixture A and B. Portion B is preferably arranged along the equatorial plane (A/B/A combination) in order to afford a structural and functional symmetry to the tire as required by its peculiar geometric shape as well as by the working conditions of the vehicle on a bend.

Figure 3:
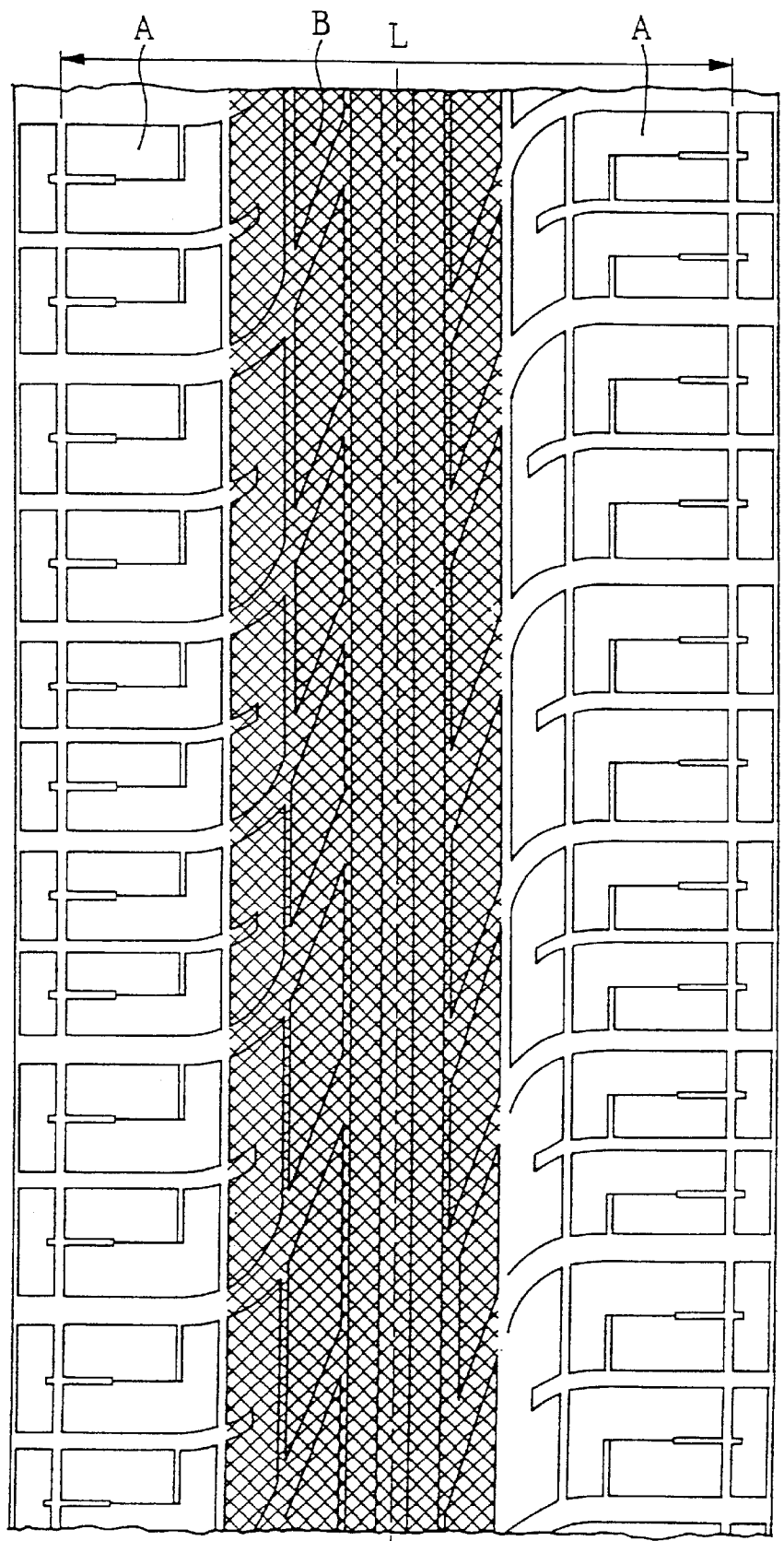
FIG. 3 is a plan view of a part of a tire tread of this invention of the symmetrical type.

FIG. 3 is a plan view of a part of a tire tread of this invention, stamped according to a known pattern of the symmetrical type. In this kind of pattern, portion B can be arranged either on a lateral position (B/A or A/B combination) or on an intermediate position (A/B/A combination). In particular, the shaded part of FIG. 3 highlights that portion B is arranged on an intermediate position (A/B/A combination) not symmetrical with respect to the equatorial plane of the tire. Depending on particular technical requirements or any other needs to be met, portion B can be arranged according to any of the combinations A/B, B/A, A/B/A, B/A/B, A/B/A/B/A, B/A/B/A/B and so like.

Figure 4:
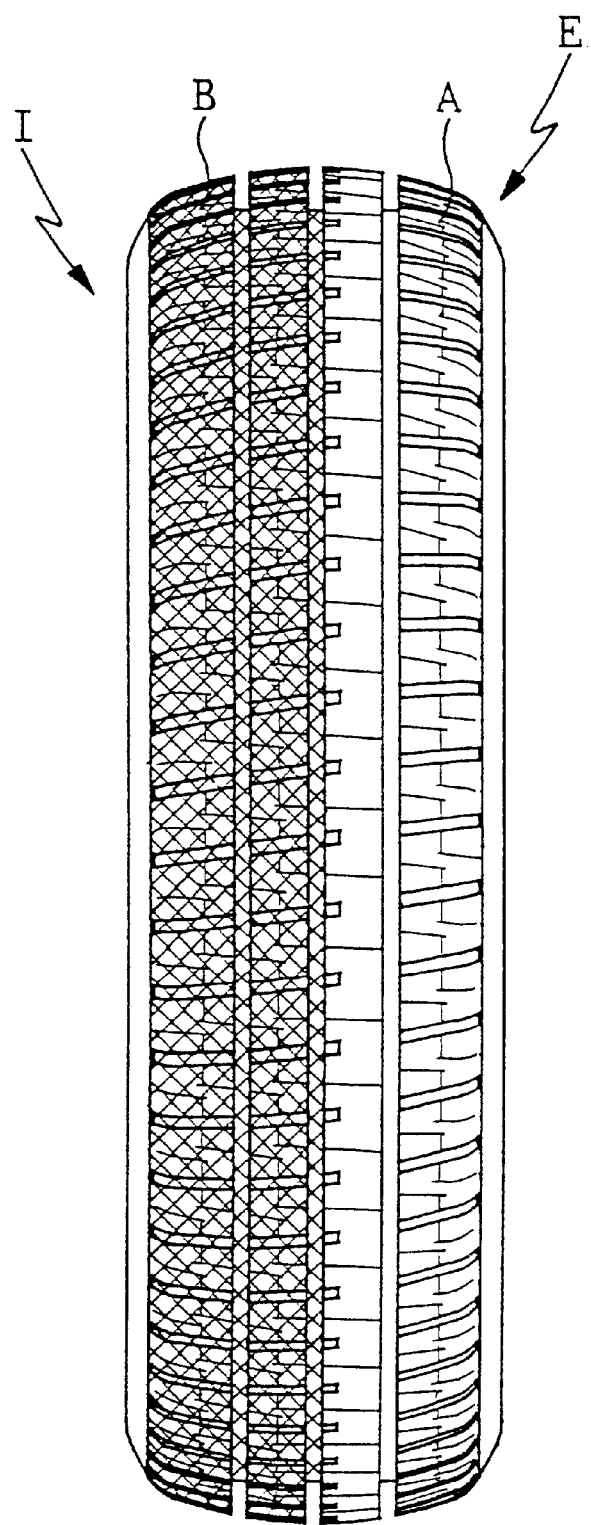
FIG. 4 is a front view of a tire of this invention of the asymmetrical type.

FIG. 4 is a front view of a tire provided with a tread of this invention stamped according to a pattern of the asymmetrical type. The tire has a first side-wall I opposite to a second side-wall E.

This tire is assembled on the vehicle with the side-wall I facing with the vehicle and the side-wall E towards the outside. In these kinds of pattern, portion B (shaded) will preferably be arranged on a lateral position of the pattern and, even more preferably, by the side-wall I (B/A combination).

Figure 5:
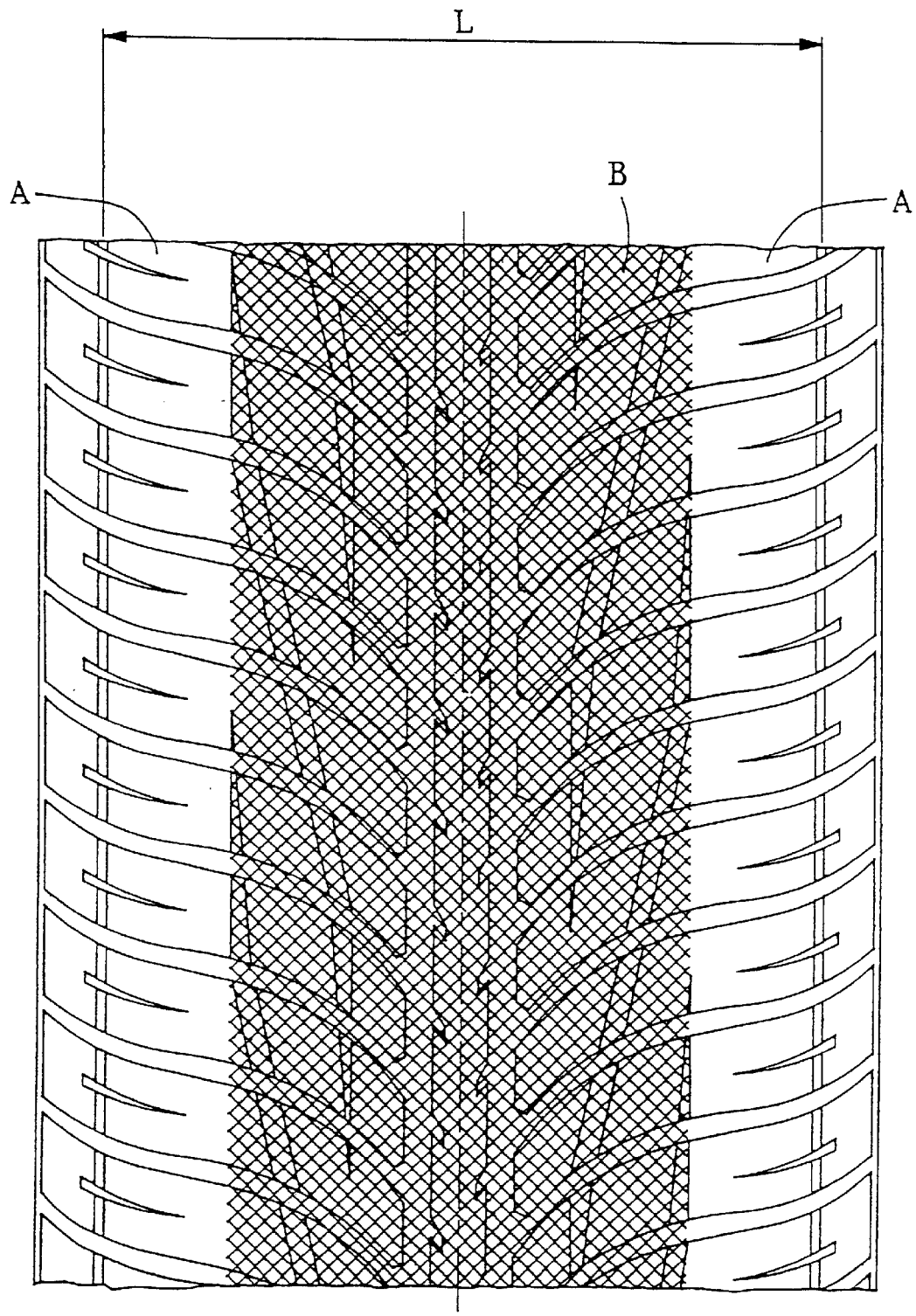
FIG. 5 is a plan view of a part of a tire tread of this invention of the directional type.

FIG. 5 is a plan view of a part of a tire tread according to the invention stamped with a pattern of the directional type. In these patterns, portion B will preferably be arranged on an intermediate position and, even more preferably, along the equatorial plane of the tire (A/B/A combination).

The working temperature of the tire of FIG. 4 has been compared by thermography with the working temperature of an identical tire (size: 175/70 R 13) except that the entire tread thereof was made of composition A only. Such comparison tire is available from Pirelli under the trademark "P200 CHRONO ENERGY™".

The elastomeric mixtures of the portions A and B had the following compositions where the amounts of the components are given in parts by weight:

| Components | Amounts | |
|---|---|---|
| | Portion A | Portion B |
| SBR 1712 | 80 | |
| SBR 1500 | 20 | |
| OE-SSBR | | 80 |
| BR | | 33 |
| Carbon black N 220 | 45 | |
| silica VN3 by Degussa | 20 | 70 |
| binding agent | 1.6 | 5.6 |
| ZnO | 2.5 | 2.5 |
| stearic acid | 2 | 2 |
| antioxidants | 1.5 | 1.5 |
| antifatigue agents | 1 | 1 |
| plasticizers | 10 | 5 |
| sulphur | 1 | 1.4 |
| vulcanization accelerating agents | 2.3 | 3.8 |

The tires under evaluation were driven in rotation by friction against a drum rotating at a pre-established speed. Such drum had diameter of 1,700 mm and was driven at a speed of 120 km/h. The tires were set on a proper rim of the type J 5.5, inflated to a pressure of 2.2 bar and loaded with 450 kg which corresponds to the nominal working load, according to "E.T.R.T.O.—European Tire and Rim Technical Organization" specifications.

The inner temperature of the tire of this invention stabilized at 53° C. after 60 minutes. while in the comparison tire stabilized at 58° C. after 60 minutes.

When the temperature was stabilized, the treads were photographed under infrared light while the tire was kept still in rotation.

It resulted an image of the tire tread suitably reproducible in color or in black and white wherein the different colors or the different shades of grey identify, point by point, the different temperatures of the tread both at the surface and at the notches bottom.

In the chromatic scale selected by the applicant the color ranges from blue to red, passing through light blue, green and yellow, as the temperature rises from 250° C. to 650° C.

Figure 6:
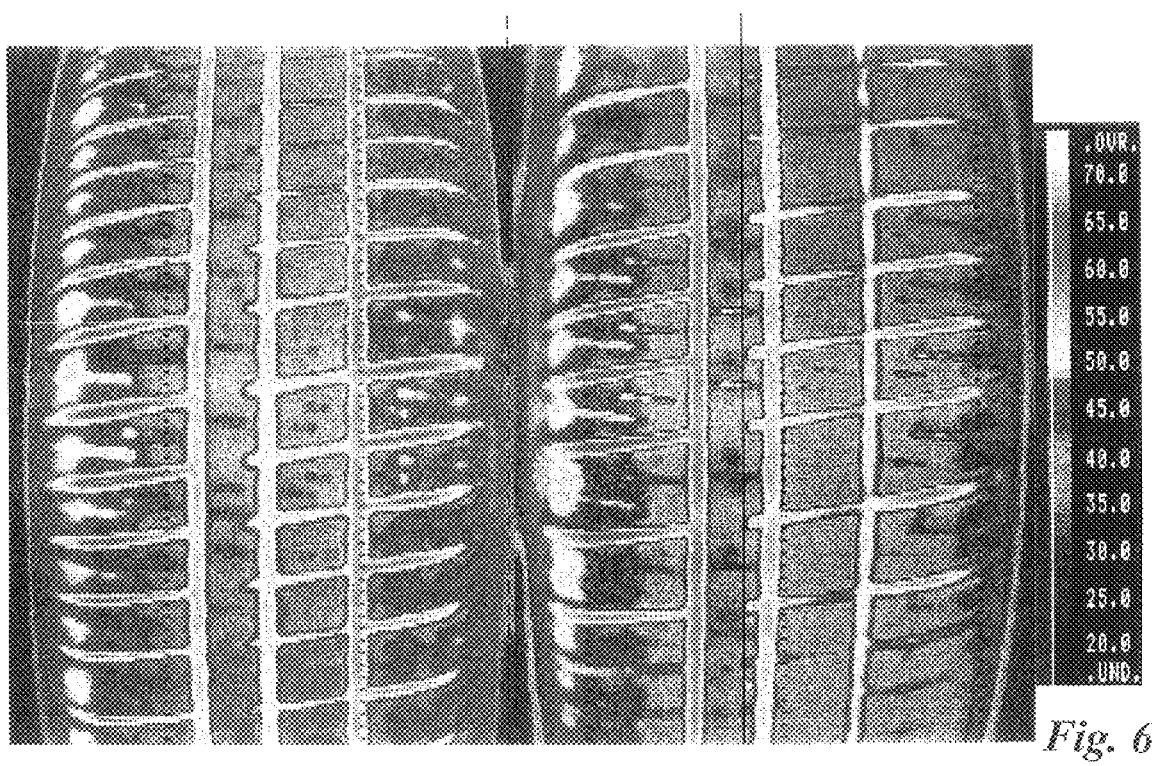
FIG. 6 shows thermographic images of a tire tread of this invention compared to that of a conventional tire tread having the very same tread pattern, of the asymmetrical type, after having worked under the same conditions.

FIG. 6 shows the thermographic images in color of the tread of FIG. 4 compared to the above mentioned comparison tire. The image on the right relates to the tire tread of this invention while that on the left relates to the comparison tire.

FIG. 6 shows that the light blue portion, colder than the green one, spans an appreciably larger area in the tire of the invention than in the comparison tire. In fact, in the tire of this invention such light blue portion spans also the left-hand shoulder made of elastomeric mixture A.

Additionally, the tire of FIG. 4, according to this invention, has been compared with the above mentioned comparison tire in several driving tests on the road. The results are shown in the following table.

TABLE

| Performance | Tire | |
|---|---|---|
| | 1 | 2 |
| Straight run | | |
| Directional stability | 6.5 | 6.5 |
| Steering rigidity | 6.5 | 6.5 |
| Fast run | | |
| Empty on the center | 6.0 | 6.5 |
| Steering response speed | 6.5 | 7.0 |
| Steering response progressivity | 5.5 | 6.0 |
| Directional stability on a bend | 6.5 | 6.5 |
| Realignment | 5.5 | 6.5 |
| Extreme conditions | | |
| Yield | 7.0 | 7.0 |
| Release on bends | 6.5 | 7.0 |
| Controllability | 7.0 | 7.0 |

1 is the comparison tire (P 200 CHRONO ENERGY ™). 2 is the tire of the invention.

The tires under evaluation were assembled on a VW Polo 1.4 car. The performance tests were carried out on a mixed run including a part on a normal road and a part on a track, having a dry surface, at a room temperature of 14° C.

The marks, on a scale of from 1 to 10, reflect the opinion of the test driver. As higher is the mark, the better is the result.

The table shows that the performance of the tire of the invention is substantially the same as that of the comparison tire in a normal straight run. That is, when the elastomeric mixture of the tread does not undergo a substantial stress.

By converse, the performance of the tire of the invention is unexpectedly substantially better as the severity of run increases.

What is claimed is:

1. A vehicle tire having a tread band comprising:
   a) a first portion comprising:
      100 parts by weight of an elastomeric material, and
      40–120 parts by weight of a filler comprising from 50 to 100% by weight of carbon black and from 0 to 50% by weight of silica, and
      3–40 parts by weight of at least one additive;
   b) a second portion comprising:
      100 parts by weight of an elastomeric material, and
      40–120 parts by weight of a filler comprising 100% by weight of silica, and
      3–40 parts by weight of at least one additive,
   said first portion and second portion defining respective portions of surface of said tread band,
   wherein the surface area of said first portion is from 37.1% to 80% of the total area of the tread band, wherein said tread band has a first outside edge and a second outside edge, wherein said first portion encompasses the first outside edge and said second portion encompasses the second outside edge of said tread band, wherein there is only one boundary between the first portion and the second portion, wherein said first portion consists of one continuous circumferential band and said second portion consists of one continuous circumferential band and said first and second portions are axially side-by-side, and
   wherein said second portion is mounted on a sidewall for facing the vehicle.

2. A tire according to claim 1, wherein the area of said first portion is of from 40 to 70% of the total area of the tread band.

3. A tire according to claim 1, wherein the area of according to said first portion is from 50 to 60% of the total area of the tread band.

4. A method comprising:
   making a vehicle tire having a tread band having a reduced working temperature in operation over routes, comprising:
   arranging the tread band on a tire carcass, the tread band having a composition comprising:
   a) a first portion comprising:
      100 parts by weight of an elastomeric material, and
      40–120 parts by weight of a filler comprising from 50 to 100% by weight of carbon black and from 0 to 50% by weight of silica, and
      3–40 parts by weight of at least one additive;
   b) a second portion comprising:
      100 parts by weight of an elastomeric material, and
      40–120 parts by weight of a filler comprising 100% by weight of silica, and
      3–40 parts by weight of at least one additive,
   said first portion and second portion defining respective portions of surface of said tread band, wherein the area of the first portion is from 37.1 to 80% of the total area of then tread band, wherein said tread band has a first outside edge and a second outside edge, wherein said first portion encompasses the first outside edge and said second portion encompasses the second outside edge of said tread band, wherein there is only one boundary between the first portion and the second portion, and wherein said first portion consists of one continuous circumferential band and said second portion consists of one continuous circumferential band and said first and second portions are axially side-by-side,
   providing the tread band with a tread pattern adapted to affect the driving characteristics of said tire during operation over routes, and
   mounting the tire on a vehicle so that the second portion is on the sidewall facing the vehicle,
   wherein the working temperature of the first portion of said tire having a reduced working temperature is less than a working temperature of a corresponding portion of a second tire having a tread band, wherein the second tire is the same as said tire having a reduced working temperature except that the tread band of the second tire only has a composition which is the same as the composition of the first portion.

5. A method according to claim 4, wherein said first and second edges being on opposed sides of an equator of said tire.

6. A method according to claim 4, wherein the area of said first portion is of from 40 to 70% of the total area of the tread band.

7. A method according to claim 4, wherein the area of said first portion is from 50 to 60% of the total area of the tread band.

8. A four wheeled motor vehicle comprising a vehicle tire having a tread band comprising:
   a) a first portion comprising:
      100 parts by weight of an elastomeric material, and
      40–120 parts by weight of a filler comprising from 50 to 100% by weight of carbon black and from 0 to 50% by weight of silica, and
      3–40 parts by weight of at least one additive;
   b) a second portion comprising:
      100 parts by weight of an elastomeric material, and
      40–120 parts by weight of a filler comprising 100% by weight of silica, and
      3–40 parts by weight of at least one additive,
   said first portion and second portion defining respective portions of surface of said tread band,
   wherein the surface area of said first portion is from 37.1% to 80% of the total area of the tread band, wherein said tread band has a first outside edge and a second outside edge, wherein said first portion encompasses the first outside edge and said second portion encompasses the second outside edge of said tread band, wherein there is only one boundary between the first portion and the second portion, wherein said first portion consists of one continuous circumferential band and said second portion consists of one continuous circumferential band and said first and second portions are axially side-by-side, and
   wherein said second portion of the tire is mounted on the sidewall facing the vehicle.

* * * * *